(12) United States Patent
Sarcione et al.

(10) Patent No.: US 7,808,427 B1
(45) Date of Patent: Oct. 5, 2010

(54) RADAR SYSTEM HAVING DUAL BAND POLARIZATION VERSATILE ACTIVE ELECTRONICALLY SCANNED LENS ARRAY

(75) Inventors: Michael G. Sarcione, Millbury, MA (US); Daniel F. Rypysc, Holliston, MA (US); Kaichiang Chang, Northborough, MA (US); Jeffrey R. Holley, Bedford, MA (US); Landon L. Rowland, Westford, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/473,433

(22) Filed: May 28, 2009

(51) Int. Cl.
*G01S 7/02* (2006.01)
*G01S 13/00* (2006.01)

(52) U.S. Cl. .............. 342/188; 342/5; 342/11; 342/82; 342/89; 342/175; 342/361; 342/368; 342/371

(58) Field of Classification Search ............ 342/5, 342/11, 82–103, 118, 146, 147, 157, 158, 342/175, 188, 195, 361–377
See application file for complete search history.

(56) References Cited

U.S. PATENT DOCUMENTS

| | | | |
|---|---|---|---|
| 2,851,681 A * | 9/1958 | Cohn | 342/188 |
| 3,403,394 A * | 9/1968 | Rouault | 342/188 |
| 3,566,403 A * | 2/1971 | Hills | 342/94 |
| 3,772,689 A * | 11/1973 | Root, Jr. | 342/188 |
| 3,849,780 A * | 11/1974 | Dynan | 342/92 |
| 4,005,425 A * | 1/1977 | Nagy | 342/188 |
| 4,035,797 A * | 7/1977 | Nagy | 342/188 |
| 4,053,882 A * | 10/1977 | Van Etten | 342/188 |
| 4,323,898 A * | 4/1982 | Barnes et al. | 342/90 |
| 4,323,899 A * | 4/1982 | Barnes et al. | 342/90 |
| 4,622,524 A | 11/1986 | Morz | |
| 4,689,627 A | 8/1987 | Lee | |
| 4,968,969 A * | 11/1990 | Drabowitch et al. | 342/188 |
| 5,262,788 A * | 11/1993 | Drabowitch et al. | 342/188 |
| 5,264,856 A * | 11/1993 | Thurlow | 342/188 |
| 5,485,167 A | 1/1996 | Wong et al. | |
| 5,500,646 A * | 3/1996 | Zrnic | 342/188 |
| 5,561,434 A | 10/1996 | Yamazaki | |
| 6,114,998 A | 9/2000 | Schefte et al. | |
| 6,473,053 B1 | 10/2002 | Krishmar-Junker et al. | |
| 6,563,470 B2 | 5/2003 | Em et al. | |
| 6,646,599 B1 * | 11/2003 | Apa et al. | 342/361 |
| 6,650,291 B1 | 11/2003 | West et al. | |
| 6,803,875 B1 * | 10/2004 | Alford et al. | 342/188 |

(Continued)

*Primary Examiner*—Bernarr E Gregory
(74) *Attorney, Agent, or Firm*—Daly, Crowley, Mofford & Durkee, LLP (57) ABSTRACT

A radar system comprises a first transmit/receive module for a first frequency band and a first polarization, a second transmit/receive module for the first frequency band and a second polarization orthogonal to the first polarization, a third transmit/receive module for a second frequency band and the first polarization, a fourth transmit/receive module for the second frequency band and the second polarization orthogonal to the first polarization, a first plurality of splitter/combiners to receive outputs from the first and second transmit/receive modules, a second plurality of splitter/combiners to receive outputs from the third and fourth transmit/receive modules, a plurality of lens phase shifter pairs to receive outputs from the first plurality of splitter/combiners, a plurality of diplexers to receive signals from the plurality of lens phase shifter pairs and from the second plurality of splitter/combiners, and, a radiator assembly including a series of radiator elements coupled to the plurality of diplexers.

13 Claims, 5 Drawing Sheets

U.S. PATENT DOCUMENTS

| | | | |
|---|---|---|---|
| 6,828,932 B1 * | 12/2004 | Jenabi | 342/188 |
| 6,859,163 B2 * | 2/2005 | Alford et al. | 342/188 |
| 7,049,997 B2 * | 5/2006 | Alford et al. | 342/188 |
| 7,116,275 B2 | 10/2006 | Hedrick | |
| 7,265,713 B2 | 9/2007 | Lewis | |

* cited by examiner

RADAR SYSTEM HAVING DUAL BAND POLARIZATION VERSATILE ACTIVE ELECTRONICALLY SCANNED LENS ARRAY

BACKGROUND OF THE INVENTION

Full field of view (FFOV) active electronically scanned arrays (AESA) are typically architected with transmit and receive amplifiers and corresponding phase and amplitude control for every element of the phased array system. This functionality can be provided by a transmit/receive (T/R) module. The element spacing is on the order of one-half the wavelength of the highest operating frequency. This leads to many thousands of elements for applications requiring large apertures. The cost of a phased array system is proportional to the number of active elements making up the AESA and the T/R modules typically represent a significant portion of the system cost. While dual band operation in a shared aperture would be highly desirable in many applications, the concomitant module count and array cost is impractical using conventional architectures.

SUMMARY OF THE INVENTION

The present invention provides methods and apparatus for radar systems having polarization versatile Active Electronically Scanned Lens Array (AESLA) that reduce the number of active elements requiring RF power and low noise amplification as compared with conventional configurations. Since fewer active elements are required, the cost of the array is substantially decreased. In addition, dual band operation, combined with the ability to synthesize arbitrary polarizations for one or both bands, provides great flexibility for multi-function radar missions. A shared antenna aperture reduces space required for the radar system and allows reuse of the back-end electronics which saves on overall system development cost.

In one aspect of the invention, a radar system comprises a first transmit/receive module for a first frequency band and a first polarization, a second transmit/receive module for the first frequency band and a second polarization orthogonal to the first polarization, a third transmit/receive module for a second frequency band and the first polarization, a fourth transmit/receive module for the second frequency band and the second polarization orthogonal to the first polarization, a first plurality of splitter/combiners to receive outputs from the first and second transmit/receive modules, a second plurality of splitter/combiners to receive outputs from the third and fourth transmit/receive modules, a plurality of lens phase shifter pairs to receive outputs from the first plurality of splitter/combiners, a plurality of diplexers to receive signals from the plurality of lens phase shifter pairs and from the second plurality of splitter/combiners, and a radiator assembly including a series of radiator elements coupled to the plurality of diplexers.

The radar system can include one or more of the following features: the first frequency band comprises X band and the second frequency band comprises S band, the system includes a reciprocal receive path, and the plurality of phase shifters provides a full field of view lens array scanning for the first frequency band.

In a further aspect of the invention, a method comprises providing a first transmit/receive module for a first frequency band and a first polarization, providing a second transmit/receive module for the first frequency band and a second polarization orthogonal to the first polarization, providing a third transmit/receive module for a second frequency band and the first polarization, providing a fourth transmit/receive module for the second frequency band and the second polarization orthogonal to the first polarization, providing a first plurality of splitter/combiners to receive outputs from the first and second transmit/receive modules, providing a second plurality of splitter/combiners to receive outputs from the third and fourth transmit/receive modules, providing a plurality of lens phase shifter pairs to receive outputs from the first plurality of splitter/combiners, providing a plurality of diplexers to receive signals from the plurality of lens phase shifter pairs and from the second plurality of splitter/combiners, and providing a radiator assembly including a series of radiator elements coupled to the plurality of diplexers.

In another aspect of the invention, a radar system comprises a first transmit/receive module for a first frequency band and a first polarization, a second transmit/receive module for the first frequency band and a second polarization orthogonal to the first polarization, a third transmit/receive module for a second frequency band and the first polarization, a fourth transmit/receive module for the second frequency band and the second polarization orthogonal to the first polarization, a plurality of diplexers to receive signals from the first, second, third, and fourth transmit/receive modules, a plurality of splitter/combiners to receive outputs from the plurality of diplexers, a plurality of lens phase shifter pairs to receive outputs from the plurality of splitter/combiners, and a radiator assembly including a series of radiator elements to receive outputs from the plurality of lens phase shifters.

In another aspect of the invention, a radar system comprises a first transmit/receive module for a first frequency band and a first polarization, a second transmit/receive module for the first frequency band and a second polarization orthogonal to the first polarization, a third transmit/receive module for a second frequency band and the first polarization, a fourth transmit/receive module for the second frequency band and the second polarization orthogonal to the first polarization, a plurality of splitter/combiners to receive outputs from the first and second transmit/receive modules, a plurality of lens phase shifter pairs to receive outputs from the plurality of splitter/combiners, and a radiator assembly including a series of radiator elements.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DETAILED DESCRIPTION

Figure 1:
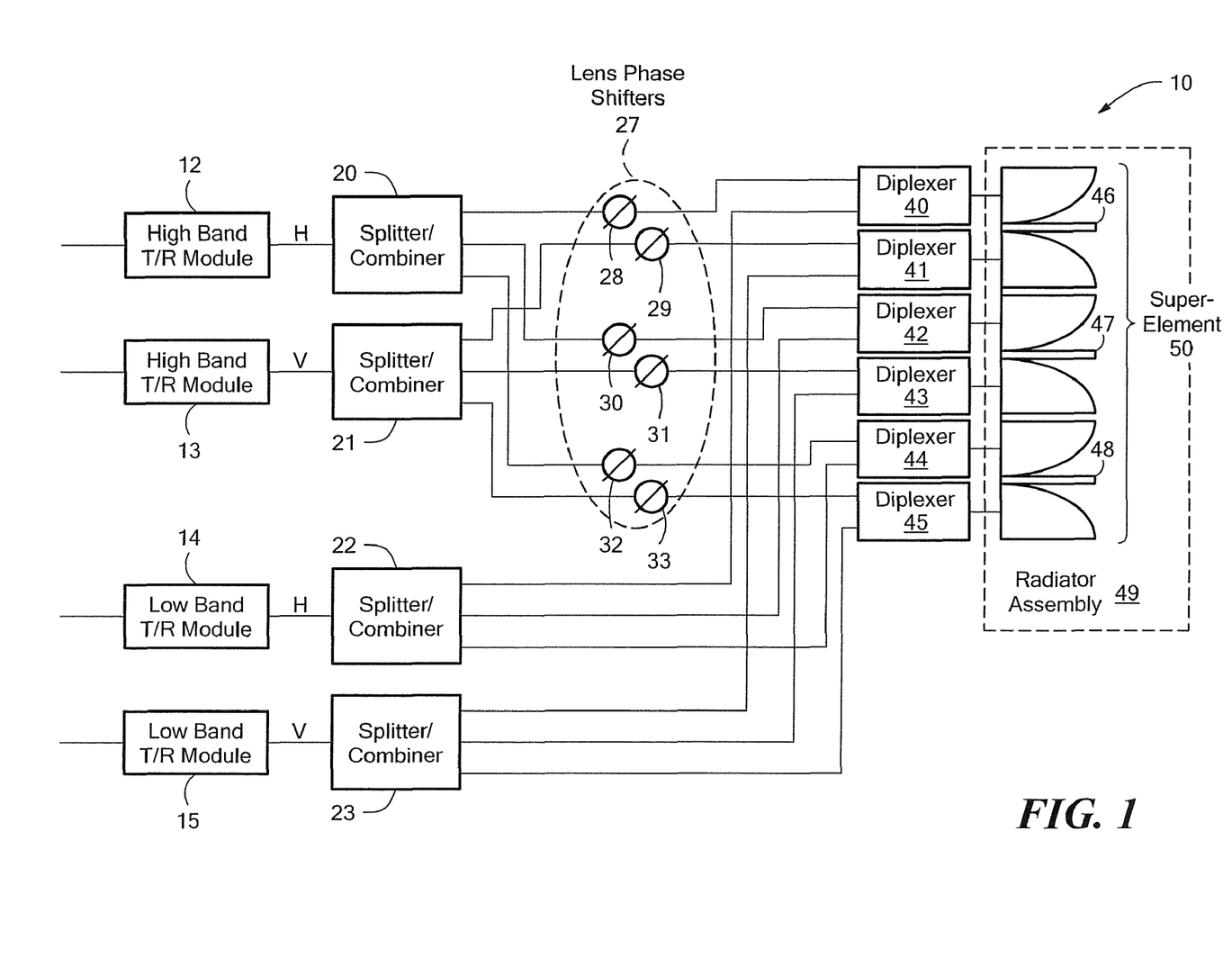
FIG. 1 is a block diagram of a radar system having a multi-band polarization versatile active electronically scanned lens array (AESLA) according to exemplary embodiments of the present invention.

FIG. 1 shows a block diagram of a radar system having a dual band polarization versatile active electronically scanned lens array (AESLA) 10 in accordance with an exemplary embodiment of the present invention, which is designed to provide full field of view (FFOV) electronic scanning for first and second frequency bands in a shared aperture. In the illustrated embodiment, four transmit/receive (T/R) modules 12-15 are provided, one for each of the two orthogonal polarizations (Horizontal (H) and Vertical (V)), and one for each of the two bands, e.g., high frequency X band and lower frequency S band. The signal output from each of the T/R modules 12, 13, 14 and 15 is fed to splitter/combiners 20, 21, 22, 23, respectively, for splitting 3 ways. Splitter/combiners 20, 21 feed the high X band signals to phase shifters 28, 29, 30, 31, 32, 33 which provide the FFOV lens array scanning for the high frequency X band.

The outputs from the phase shifters 28-33 are fed to one of diplexers 40-45 along with the outputs from the low frequency S band splitter/combiners 22, 23. The diplexers 40-45 combine the signals from the two bands at the input, and the output of the diplexers 40-45 is fed to a radiator feed for that polarization. In an exemplary embodiment, the radiating elements employ a super-element 50 fed by the T/R modules 12, 13, 14, 15. For simplicity, the super-element 50 is shown in FIG. 1 as a group of three radiating elements 46, 47, 48; however, in a radar system the super-element would typically be in the order of 8-16 radiating elements arranged linearly or in two dimensions. The radiating elements are wideband or dual band radiators spaced on a lattice that enables FFOV scanning at high X band. The super-element groups are spaced on a lattice that enables FFOV scanning at the low S band.

The N radiating elements are fed by four T/R modules 12-15, one each for the two orthogonal polarizations and two bands. Considering the transmit path (receive path is reciprocal), the signal from each T/R module 12-15 is split N ways by the splitter/combiners 20-23. For the low band, 2N transmission lines route the signals to the diplexers 40-45 at each radiator 46-48. For the high band, 2N transmission lines route the signals through phase shifters 28-33, then on to the diplexers 40-45. The phase shifters 28-33 provide the FFOV "lens" array scanning for the high frequency band, while the low frequency band signals bypass the phase shifters 28-33. The phase shifters 28-33 may be embodied by any one of a number of transmission and phase/time delay techniques including pin diodes, ferroelectrics or micro-electro-mechanical systems (MEMS). At each diplexer 40-45, the lines from the different frequency bands are combined and the output is fed to the radiator feed.

In the exemplary embodiment of FIG. 1, the phase shifters 28-33 are implemented with MEMS which are integrated onto a power splitter/combiner on a multi-layer substrate. One performance consideration is a very low loss phase shifter with an adequate number of bits to shift the phase of the radiated signal in order to form a beam of coherent energy from the super-element array 50. In one embodiment, a 3-bit MEMS phase shifter 28-33 is used in FIG. 1 for low insertion loss in a small package. This phase shifter is based on a hybrid reflection/loaded line topology to achieve eight discrete phase states with a least significant bit of 45 degrees. The phase shifting is accomplished using the low-loss MEMS switches that change the RF signal path depending on whether they are in an open or closed state, which alters the phase of the signal through the device.

The power splitter/combiner 20-23 is a low-loss passive device with good phase and amplitude tracking between channels. Typical phase and amplitude errors are <10° and <0.5 dB respectively. In practice, the power splitter can be implemented in a variety of ways. In the present embodiment, the power splitter/combiners 20-23 are implemented a mixed-signal distribution board, including RF, power and signal routing. This is implemented in an RF stripline configuration. Power and logic routing for the phase shifters 28-33 is also contained in the mixed-signal distribution board. The mixed-signal distribution board can be implemented using a variety of common microwave circuit board materials such as the Teflon-loaded products available from common suppliers and readily known to those skilled in the art. The phase shifters are mounted to the surface of the distribution board. The outputs of the power splitter/combiners 20-23 are fed to the inputs of the phase shifters 28-33.

It is understood that in other embodiments, additional frequency bands can be used with the addition of further splitter/combiner, diplexers, and phase shifters. It is further understood that while X and S frequency bands are used in the exemplary embodiment of FIG. 1, other practical frequencies can also be used depending upon the needs of a particular application.

Figure 2:
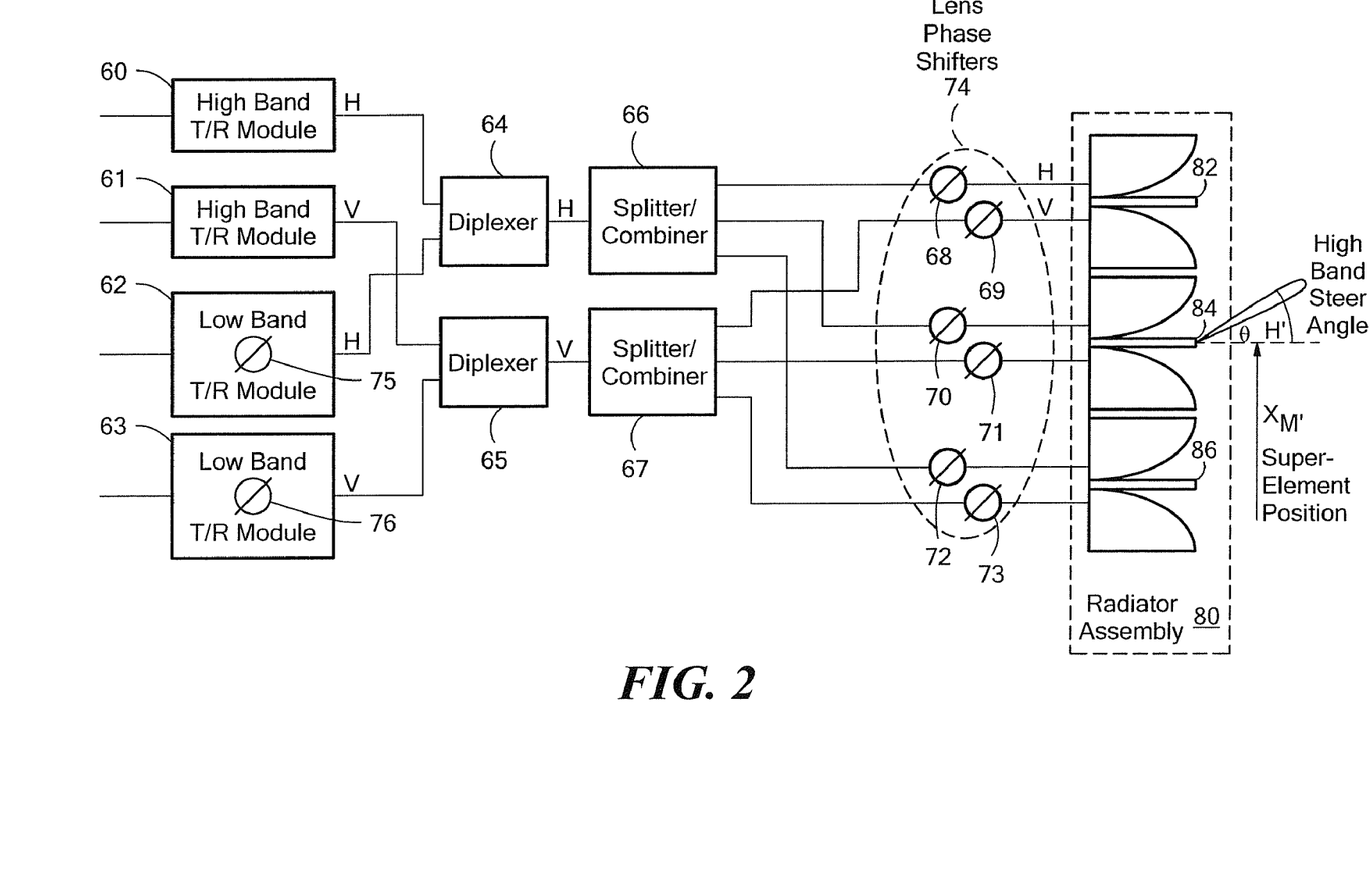
FIG. 2 is a block diagram of an alternate embodiment of a multi-band polarization versatile AESLA according to exemplary embodiments of the present invention.

FIG. 2 shows an alternate embodiment of a dual band polarization versatile AESLA comprising fewer diplexers 64, 65 and splitter/combiners 66, 67 than the embodiment of FIG. 1. In this arrangement, low band signal perturbations can result from the low band signals passing through the high band phase shifters. In the illustrated embodiment, four transmit/receive (T/R) modules 60-63 are provided, one for each of the two orthogonal polarizations (e.g., horizontal H and vertical V), and one for each of the two bands, high frequency X band and lower frequency S band. The signal output from each of the T/R modules 60-63 is fed to diplexers 64, 65. The high and low band H polarization signals from T/R modules 60 and 62 are fed to the first diplexer 64, and the high and low band V polarization signals from T/R modules 61 and 63 are fed to the second diplexer 65. An H polarization output from diplexer 64 is fed to splitter/combiner 66, and a V polarization output from diplexer 65 is fed to splitter/combiner 67. The splitter/combiners 66, 67 provide 6 output signals each of which passes through one of lens phase shifters 68-73 and then to radiator elements 82-86. Each of the radiator elements 82, 84, 86 receive an H and a V polarization signal from the lens phase shifters 68-73.

The radiator assembly 80 is a wideband device which covers both the low and high band operating frequencies. In one embodiment, the radiator assembly 80 is dual-polarized with separate feeds for each orthogonal polarization. The radiator assembly 80 provides the means for radiating two independent polarizations into free space. Further embodiments can includes more than two frequency bands using multiplexers with an input signal instead of diplexers before each radiator element.

The diplexers 64, 65 receive their inputs from the T/R modules 60-63 and the number of splitter/combiners 66, 67 is reduced to two. However, the low band signal is now perturbed by the high band phase shift, because the signal path is shared by both bands.

Compensating phase shifters 75, 76 can be provided in the low band T/R modules 62, 63 to avoid distribution of the low band beam by weightings providing phase corrections in the T/R modules 62, 63 to compensate for lens perturbation to the low band signals by the lens phase shifters 68-73.

For a phase shifter that has a frequency-dependent phase shift, the required compensation phase is given by:

$$\Phi = -(2\pi/\lambda_L) X_M \sin(\theta_H)$$

where $\lambda_L$ is the low band wavelength, $X_M$ is the position of the super-element phase center, and $\theta_H$ is the high band beam steer angle. For a phase shifter with broadband flat frequency response, such as a high-pass/low-pass design topology, the required compensation phase is:

$$\Phi = -(2\pi/\lambda_H) X_M \sin(\theta_H)$$

where $\lambda_H$ is the high band wavelength.

Figure 3:
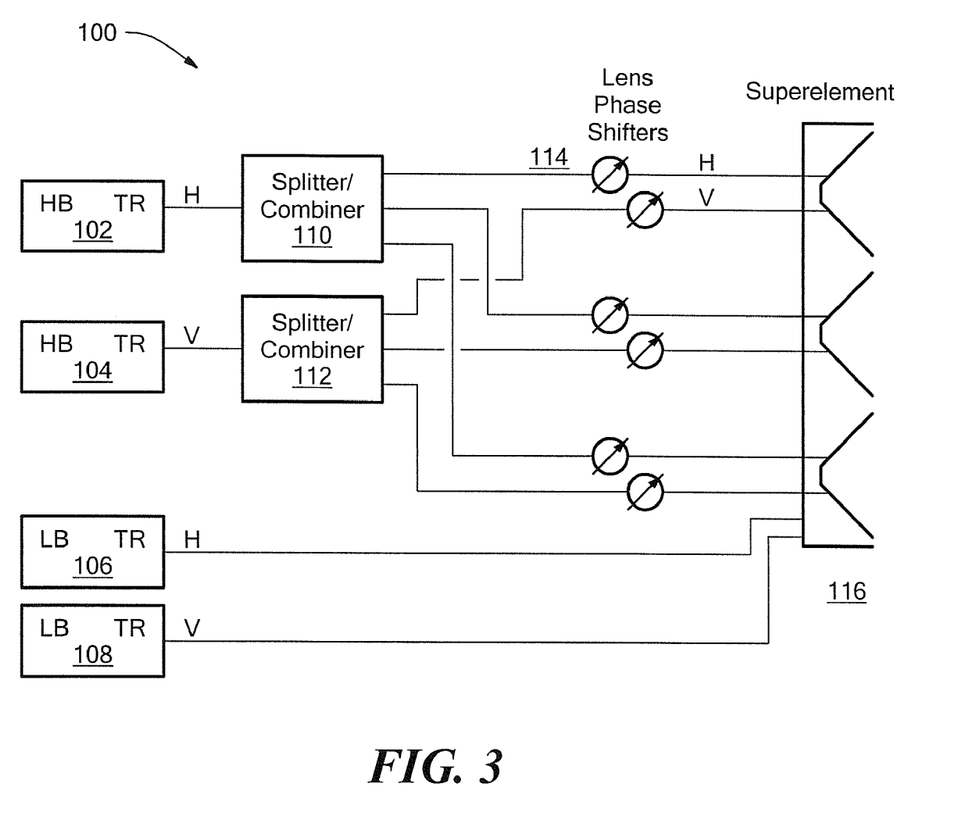
FIG. 3 is a block diagram of a further alternative embodiment of a multi-band polarization versatile AESLA in accordance with exemplary embodiments of the invention.

FIG. 3 shows a further embodiment of a dual band polarization versatile AESLA system 100 in accordance with exemplary embodiments of the invention having an interleaved dual band aperture. The system 100 includes a first T/R module 102 for high band horizontal polarization, a second T/R module 104 for high band vertical polarization, a third T/R module 106 for low band horizontal polarization, and a fourth T/R module 108 for low band vertical polarization. A first splitter/combiner 110 receives the high band horizontal signal and provides first, second, and third outputs. Similarly, a second splitter/combiner 112 receives the high band vertical signal and provides first, second, and third outputs.

Pairs of outputs from the first and second splitter/combiners 110, 112 are provided to respective lens phase shifters 114, which are coupled to the interleaved radiator assembly 116. The diplexers of the previous embodiment are eliminated and the high band and low band frequencies have separate paths to an interleaved radiator assembly 116.

Figure 4:
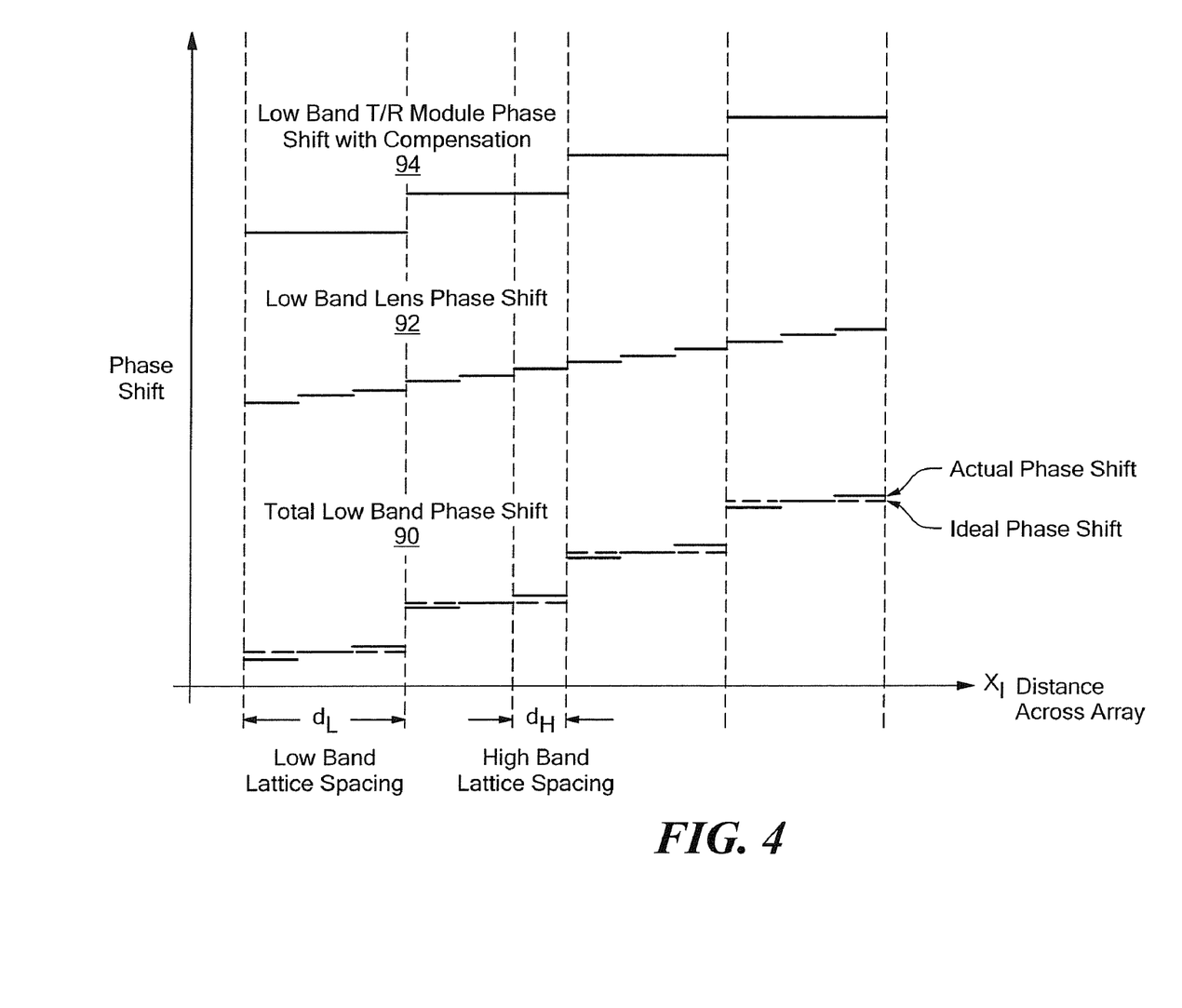
FIG. 4 is a graph showing low band phase shift using scan compensation.

FIG. 4 is a graph showing the low band phase shift using the scan compensation of FIG. 2. The total low band phase shift 90 is the sum of the low band T/R module phase shift 92 plus the perturbation 94 from the lens phase shifters 68-73. The compensation is exact at the center of each radiator super-element, but there is a quantized phase error at the other radiator elements, increasing towards the edges of the super-element.

Figure 5:
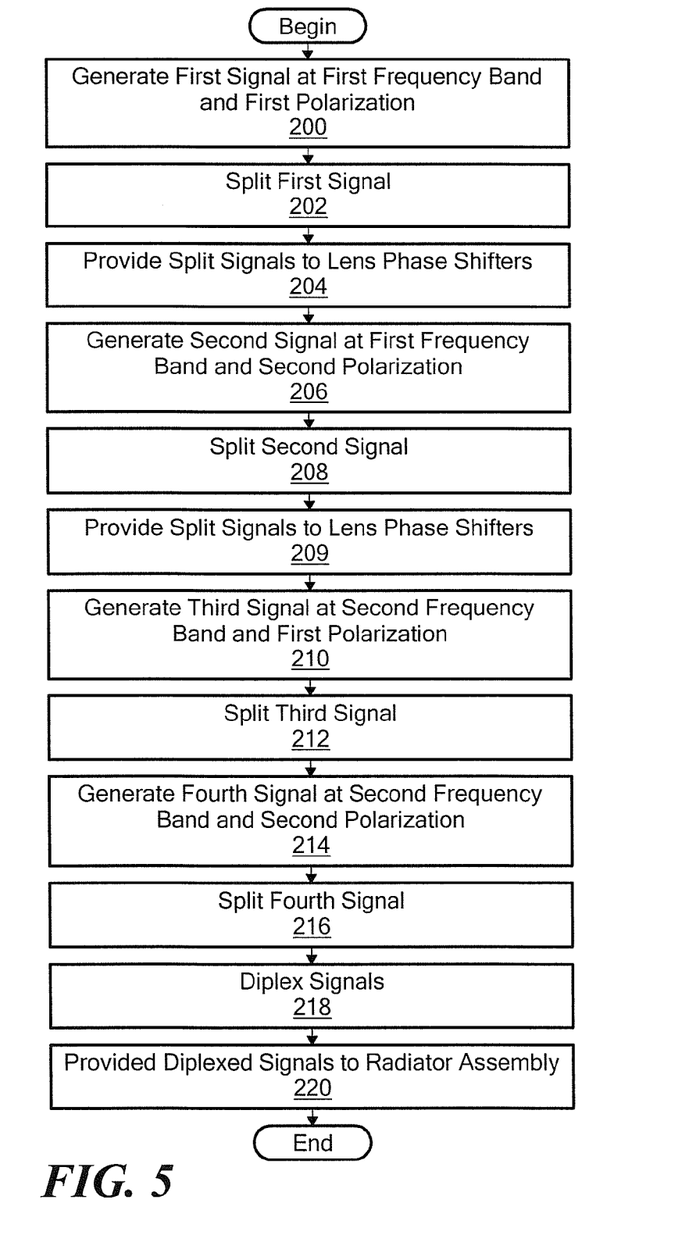
FIG. 5 is a flow diagram showing an exemplary sequence of steps for providing dual band polarization versatile active electronically scanned lens array (AESLA) functionality in accordance with exemplary embodiments of the invention.

FIG. 5 in conjunction with FIG. 1 shows an exemplary sequence of steps for implementing a polarization versatile active electronically scanned lens array having a full field of view in accordance with exemplary embodiments of the invention. In step 200, a first signal at a first frequency band and a first polarization is provided by a first transmit/receive module 12. In step 202, the first signal is split by a splitter/combiner 20 into multiple output signals. In step 204, the splitter/combiner output signals are provided to lens phase shifters 28, 30, 32.

In step 206, a second signal at the first frequency band at a second polarization orthogonal to the first polarization is provided by a second transmit/receive module 13. In step 208, the second signal is split by a splitter/combiner 21 into multiple output signals. In step 209, the split signals are provided to lens phase shifters 29, 31, 33.

In step 210, a third signal at a second frequency band at the first polarization is provided by a third transmit/receive module 14. In step 212, the third signal is split by a splitter/combiner 22 into multiple output signals. In step 214, a fourth signal at the second frequency band and the second polarization is provided by a fourth transmit/receive module 23. In step 216, the fourth signal is split by a splitter/combiner 23 into multiple output signals.

In step 218, a series of diplexers 40-45 receive the phase shifter outputs for the first frequency band signals and the split signals from the second frequency band splitter/combiners 22, 23. In step 220, signals from the diplexers 40-45 are provided to respective radiator elements in a radiator assembly 49.

In an alternative method embodiment, diplexers receive signals from the transmit/receive modules and provide outputs to splitter/combiners, which provide outputs to a lens phase shifters, as shown in FIG. 2. Phase compensators can be provided for the low band transmit/receive modules. In a further embodiment, the diplexers are eliminated by interleaving the signal to the radiator assembly, as shown in FIG. 3.

This invention has been disclosed in terms of certain embodiments. It will be apparent that many modifications can be made to the disclosed apparatus without departing from the invention. Therefore, it is the intent of the appended claims to cover all such variations and modifications as come within the spirit and scope of this invention.

What is claimed is:

1. A radar system, comprising:
   a first transmit/receive module for a first frequency band and a first polarization;
   a second transmit/receive module for the first frequency band and a second polarization orthogonal to the first polarization;
   a third transmit/receive module for a second frequency band and the first polarization;
   a fourth transmit/receive module for the second frequency band and the second polarization orthogonal to the first polarization;
   a first plurality of splitter/combiners to receive outputs from the first and second transmit/receive modules;
   a second plurality of splitter/combiners to receive outputs from the third and fourth transmit/receive modules;
   a plurality of lens phase shifter pairs to receive outputs from the first plurality of splitter/combiners;
   a plurality of diplexers to receive signals from the plurality of lens phase shifter pairs and from the second plurality of splitter/combiners; and
   a radiator assembly including a series of radiator elements coupled to the plurality of diplexers.

2. The radar system according to claim 1, wherein the first frequency band comprises X band and the second frequency band comprises S band.

3. The radar system according to claim 1, wherein the system includes a reciprocal receive path.

4. The radar system according to claim 1, wherein the plurality of phase shifters provides a full field of view lens array scanning for the first frequency band.

5. A radar system, comprising:
   a first transmit/receive module for a first frequency band and a first polarization;
   a second transmit/receive module for the first frequency band and a second polarization orthogonal to the first polarization;
   a third transmit/receive module for a second frequency band and the first polarization;
   a fourth transmit/receive module for the second frequency band and the second polarization orthogonal to the first polarization;
   a plurality of diplexers to receive signals from the first, second, third, and fourth transmit/receive modules;
   a plurality of splitter/combiners to receive outputs from the plurality of diplexers;
   a plurality of lens phase shifter pairs to receive outputs from the plurality of splitter/combiners; and
   a radiator assembly including a series of radiator elements to receive outputs from the plurality of lens phase shifters.

6. The radar system according to claim 5, wherein the third and fourth transmit receive modules include compensation phase shifters.

7. The radar system according to claim 5, wherein the first frequency band comprises X band and the second frequency band comprises S band.

8. The radar system according to claim 5, wherein the system includes a reciprocal receive path.

9. The radar system according to claim 5, wherein the plurality of phase shifters provides a full field of view lens array scanning for the first frequency band.

10. A radar system, comprising:
- a first transmit/receive module for a first frequency band and a first polarization;
- a second transmit/receive module for the first frequency band and a second polarization orthogonal to the first polarization;
- a third transmit/receive module for a second frequency band and the first polarization;
- a fourth transmit/receive module for the second frequency band and the second polarization orthogonal to the first polarization;
- a plurality of splitter/combiners to receive outputs from the first and second transmit/receive modules;
- a plurality of lens phase shifter pairs to receive outputs from the plurality of splitter/combiners; and
- a radiator assembly including a series of radiator elements coupled to the plurality of lens phase shifters.

11. The radar system according to claim 10, wherein the first frequency band comprises X band and the second frequency band comprises S band.

12. The radar system according to claim 10, wherein the system includes a reciprocal receive path.

13. The radar system according to claim 10, wherein the plurality of phase shifters provide a full field of view lens array scanning for the first frequency band.

* * * * *